(12) United States Patent
Huang

(10) Patent No.: US 6,671,963 B1
(45) Date of Patent: Jan. 6, 2004

(54) STRUCTURE DESIGNED TO DETACHABLY BRACE A BLADE PORTION AND HANDLE PORTION OF A TREE PRUNER

(76) Inventor: Yu-Hsin Huang, No. 2, Alley 1, Lane 722, Sec. 4, Yen Hai Rd., Fu Shing Hsiang, Chang Hua Hsien (TW)

( * ) Notice: Subject to any disclaimer, the term of this patent is extended or adjusted under 35 U.S.C. 154(b) by 41 days.

(21) Appl. No.: 10/162,047

(22) Filed: Jun. 5, 2002

(51) Int. Cl.⁷ .......................... B26B 13/00; B26B 13/12
(52) U.S. Cl. ............................................. 30/122; 30/249
(58) Field of Search .......................... 30/122, 249–251, 30/188–190, 329, 332, 517

(56) References Cited

U.S. PATENT DOCUMENTS 1,370,208 A * 3/1921 Halicki
1,644,316 A * 10/1927 Wiard et al.
6,446,343 B1 * 9/2002 Huang ........................... 30/249

* cited by examiner

Primary Examiner—Douglas D. Watts
(74) Attorney, Agent, or Firm—Harrison & Egbert

(57) ABSTRACT

A tree pruner includes a blade portion, a handle portion, and a brace portion for fastening detachably the blade portion and the handle portion. The brace portion is formed of a connection member pivoted at one end with the blade portion by a pivot, and a bracing member pivoted at one end with the other end of the connection member such that the other end of the bracing member detachably fastens the handle portion in conjunction with a control member and a retaining member.

1 Claim, 8 Drawing Sheets

STRUCTURE DESIGNED TO DETACHABLY BRACE A BLADE PORTION AND HANDLE PORTION OF A TREE PRUNER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a tree pruner, and more particularly to a structure for bracing detachably a blade portion and a handle portion of the tree pruner.

BACKGROUND OF THE INVENTION

As shown in FIG. 1, a tree pruner 10 of the prior art comprises a blade portion 11, a handle portion 12, and a bracing member 13 for fastening fixedly the blade portion 11 with the handle portion 12. In the event that the blade portion 11 or handle portion 12 is damaged, the tree pruner 10 is useless in its entirety. In addition, the prior art tree pruner 10 is useless in a situation which calls for the usage of a blade portion different from the blade portion 11 of the tree pruner 10. In light of the way by which the blade portion 11 is fastened to the handle portion 12, the prior art tree pruner 10 lacks versatility.

BRIEF SUMMARY OF THE INVENTION

The primary objective of the present invention is to provide a tree pruner adaptable to many uses or functions.

In keeping with the principle of the present invention, the foregoing objective of the present invention is attained by the tree pruner comprising a blade portion, a handle portion, and a brace portion for fastening detachably the blade portion with the handle. The present invention can be fastened interchangeably with a plurality of blade portions of various designs, depending on the gardening requirements.

The features and the advantages of the present invention will be more readily understood upon a thoughtful deliberation of the following detailed description of the present invention with reference to the accompanying drawings.

DETAILED DESCRIPTION OF THE INVENTION

Figure 1:
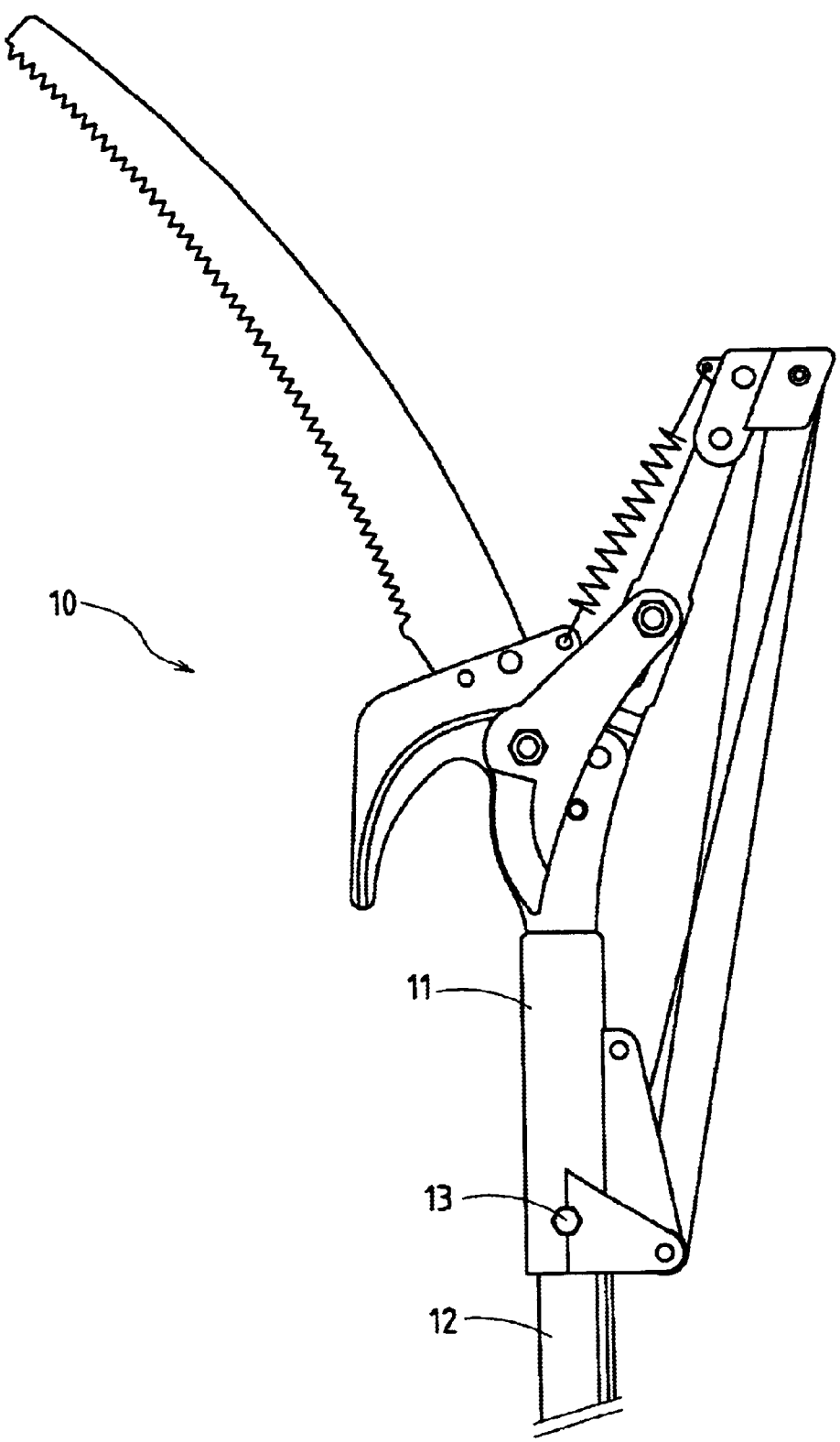
FIG. 1 shows a perspective view of a tree pruner of the prior art.
Figure 2:
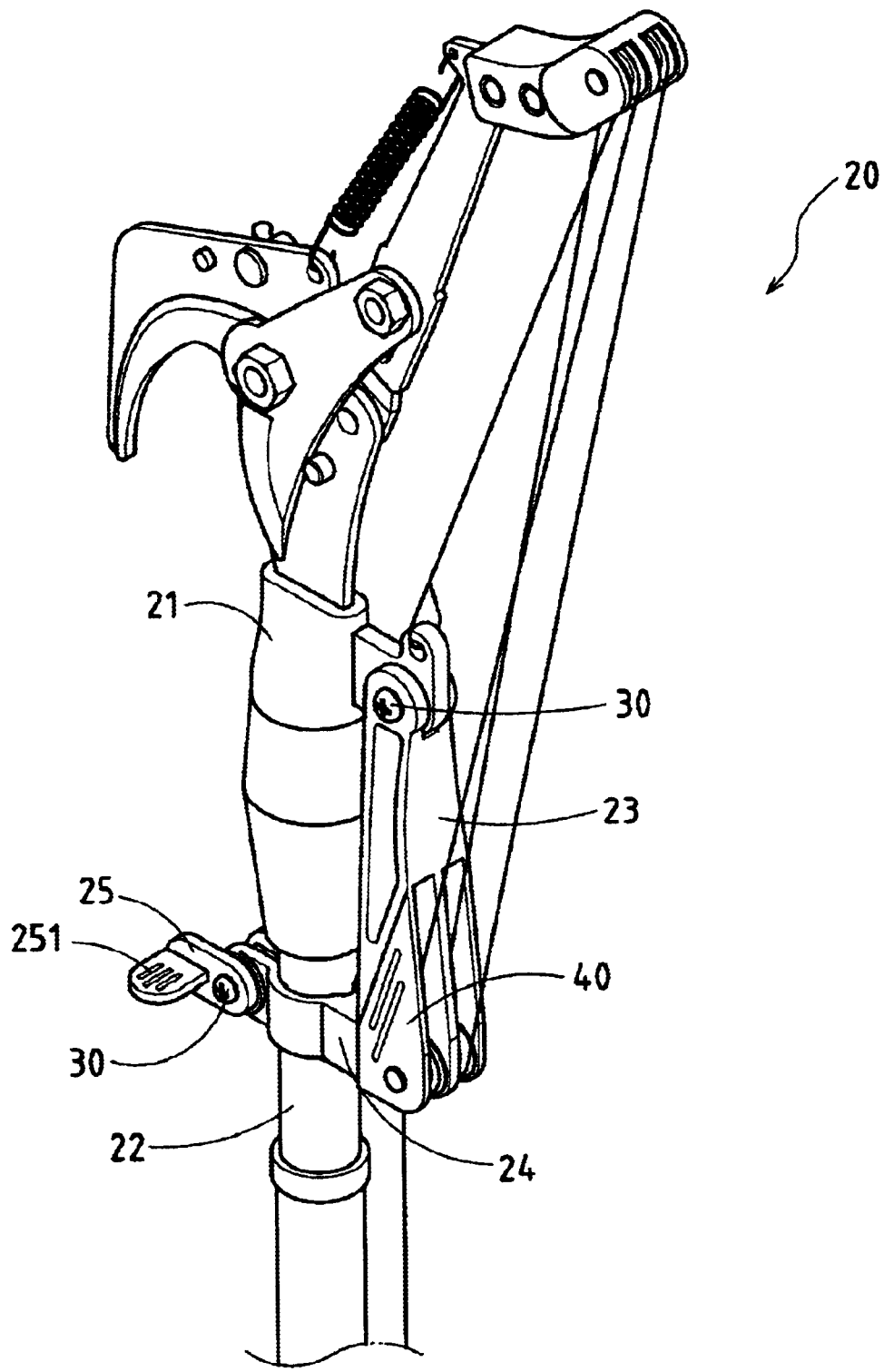
FIG. 2 shows a perspective view of a tree pruner of the present invention.
Figure 3:
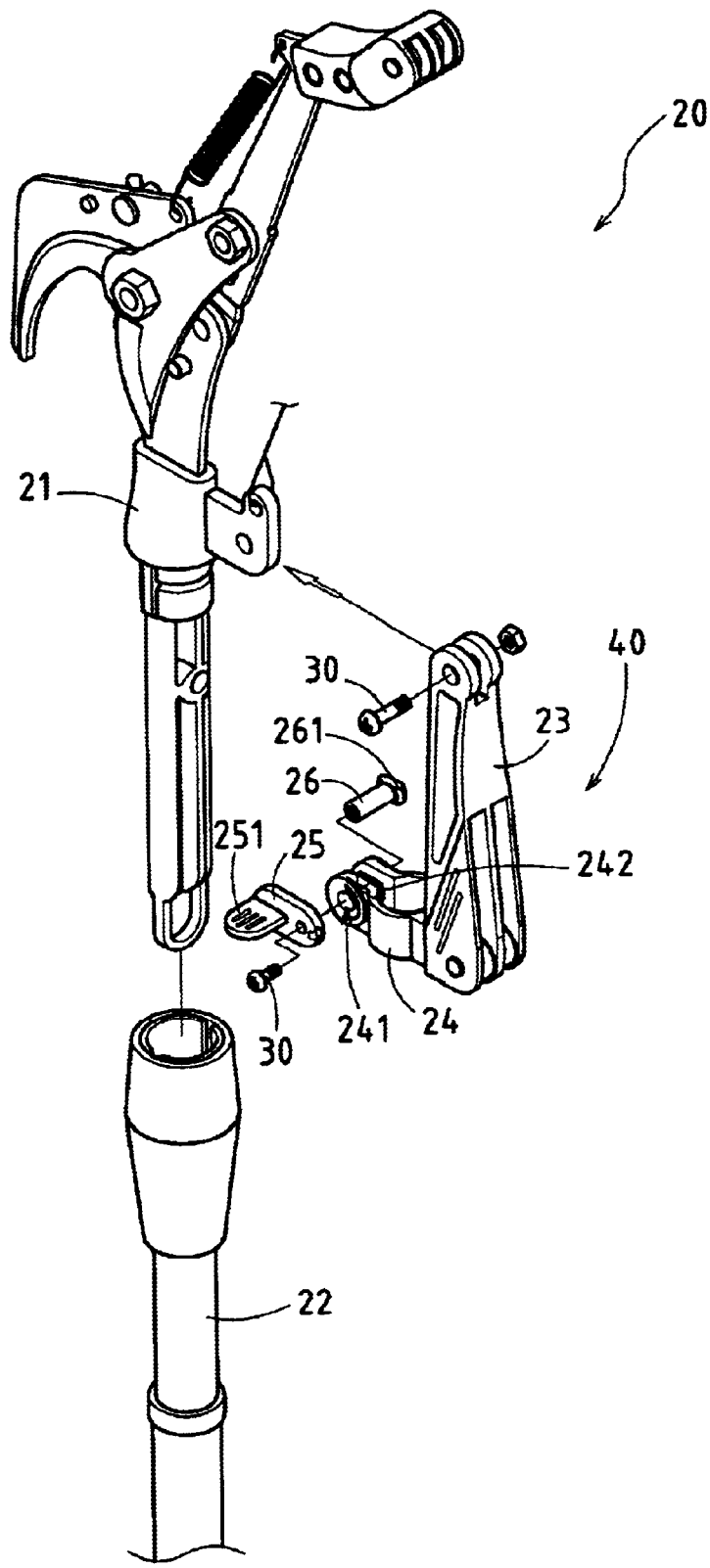
FIG. 3 shows an exploded view of the tree pruner of the present invention.
Figure 4:
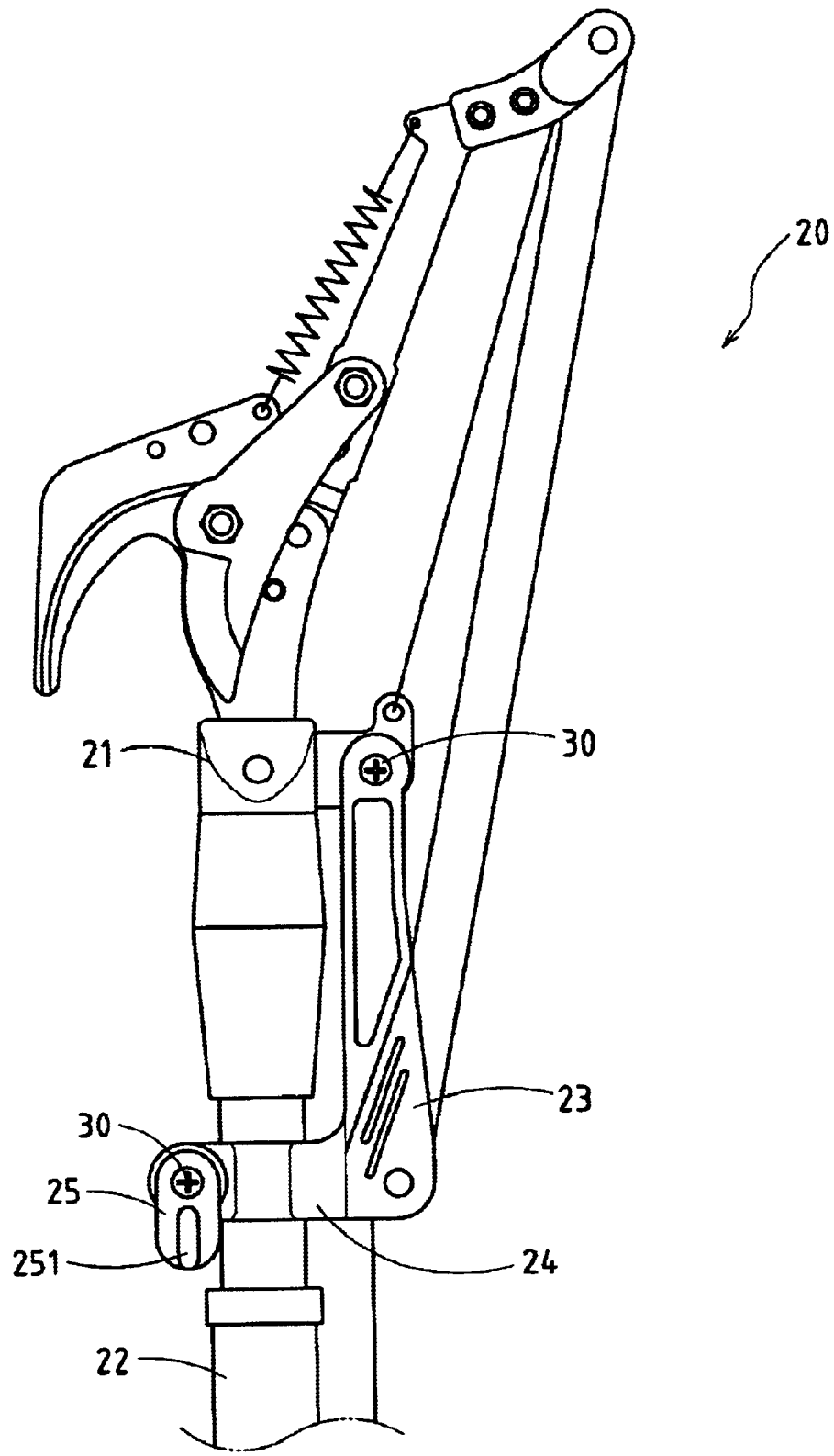
FIG. 4 shows a side view of the tree pruner of the present invention.

As shown in FIGS. 2, 3, and 4, a tree pruner 20 of the present invention comprises a blade portion 21, a handle portion 22, and a brace portion 40 by which the blade portion 21 is detachably fastened with the handle portion 22.

As shown in FIG. 3, the brace portion 40 comprises a connection member 23, a bracing member 24, a control member 25, and a retaining member 26.

The connection member 23 is pivotally fastened at one end with the blade portion 21 by a pivot 30.

The bracing member 24 is pivoted at one end with other end of the connection member 23 and is provided at other end with a through hole 241 and a retaining slot 242.

The control member 25 is pivotally fastened with the other end of the bracing member 24 by a pivot 30 in conjunction with the retaining member 26 which is received in the through hole 241 of the bracing member 23 such that one end of the retaining member 26 is engaged with the pivot 30. The control member 25 is provided with a control piece 251 extending therefrom. The retaining member 26 is provided at other end with a flange 261, which is retained in the retaining slot 242 of the bracing member 24.

Figure 8:
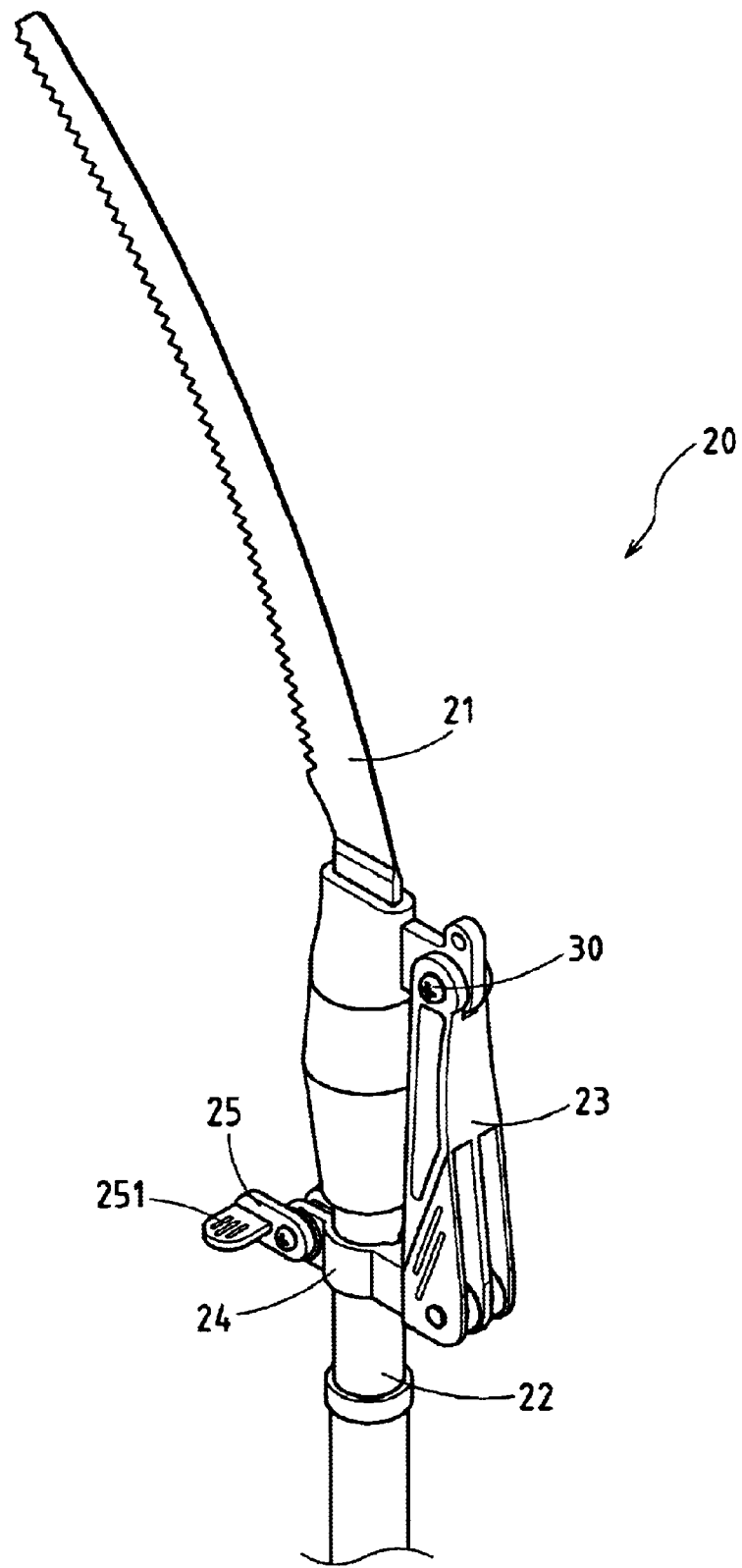
FIG. 8 shows a schematic view of the tree pruner of the present invention comprising a blade portion capable of making saw-like cutting motions.

The blade portion 21 and the handle portion 22 are detachably fastened together by the brace portion 40 such that the blade portion 21 is fastened with the connection member 23 of the brace portion 40, and that the handle portion 22 is fastened with the bracing member 24 in conjunction with the control member 25 and the retaining member 26. The retaining member can be actuated to turn by the control member 25 such that the flange 261 of the retaining member 26 is turned and retained in the retaining slot 242 of the bracing member 24. Both the blade portion 21 and the handle portion 22 can be easily unfastened with the brace portion 40. In the event that a gardening situation calls for the usage of a blade portion 21 capable of making sawlike cutting motions, the blade portion capable of scissors action is replaced by the sawlike blade portion 21, as shown in FIG. 8.

Figure 5:
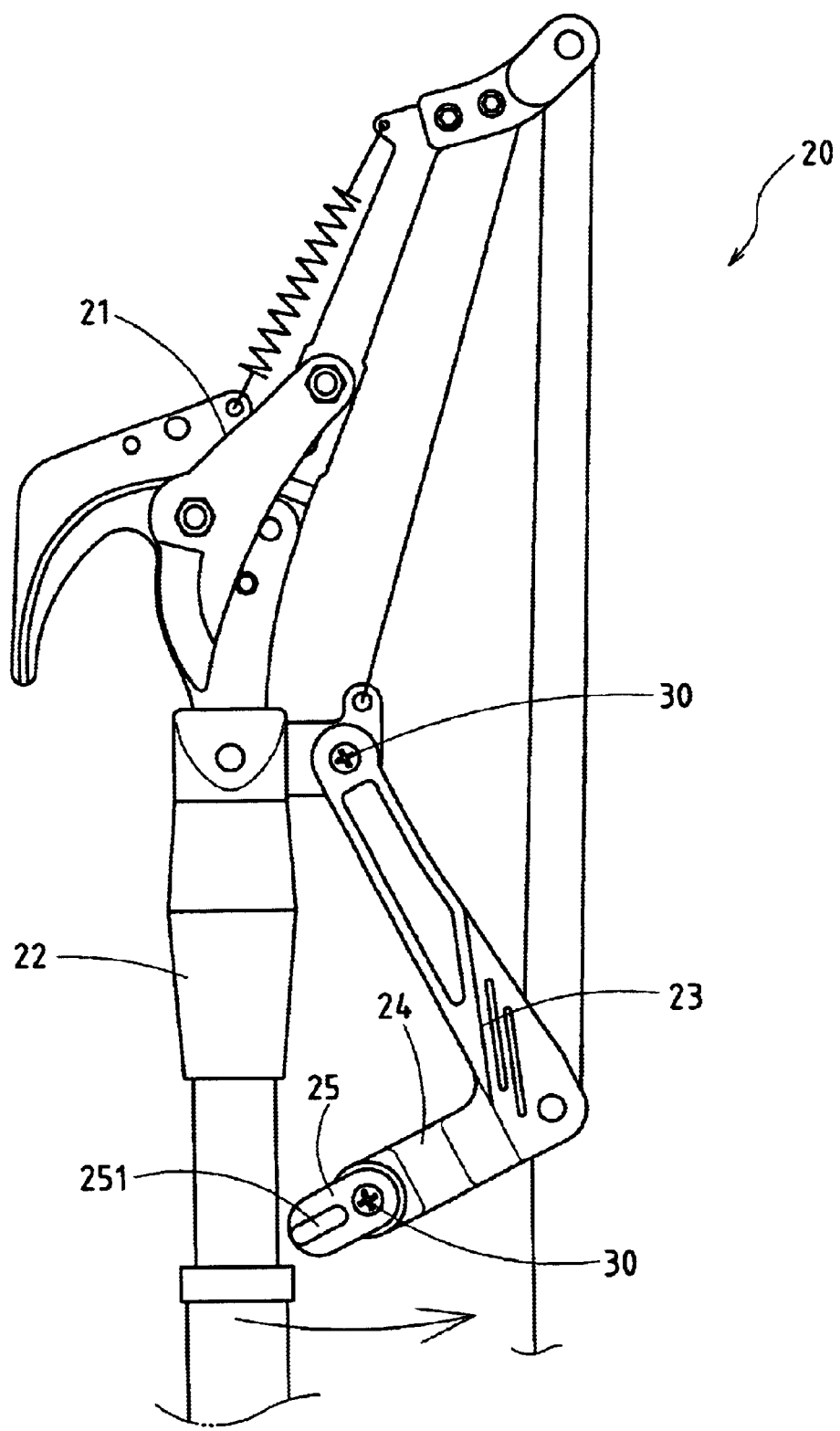
FIG. 5 shows a schematic view of the tree pruner of the pre invention in action.
Figure 6:
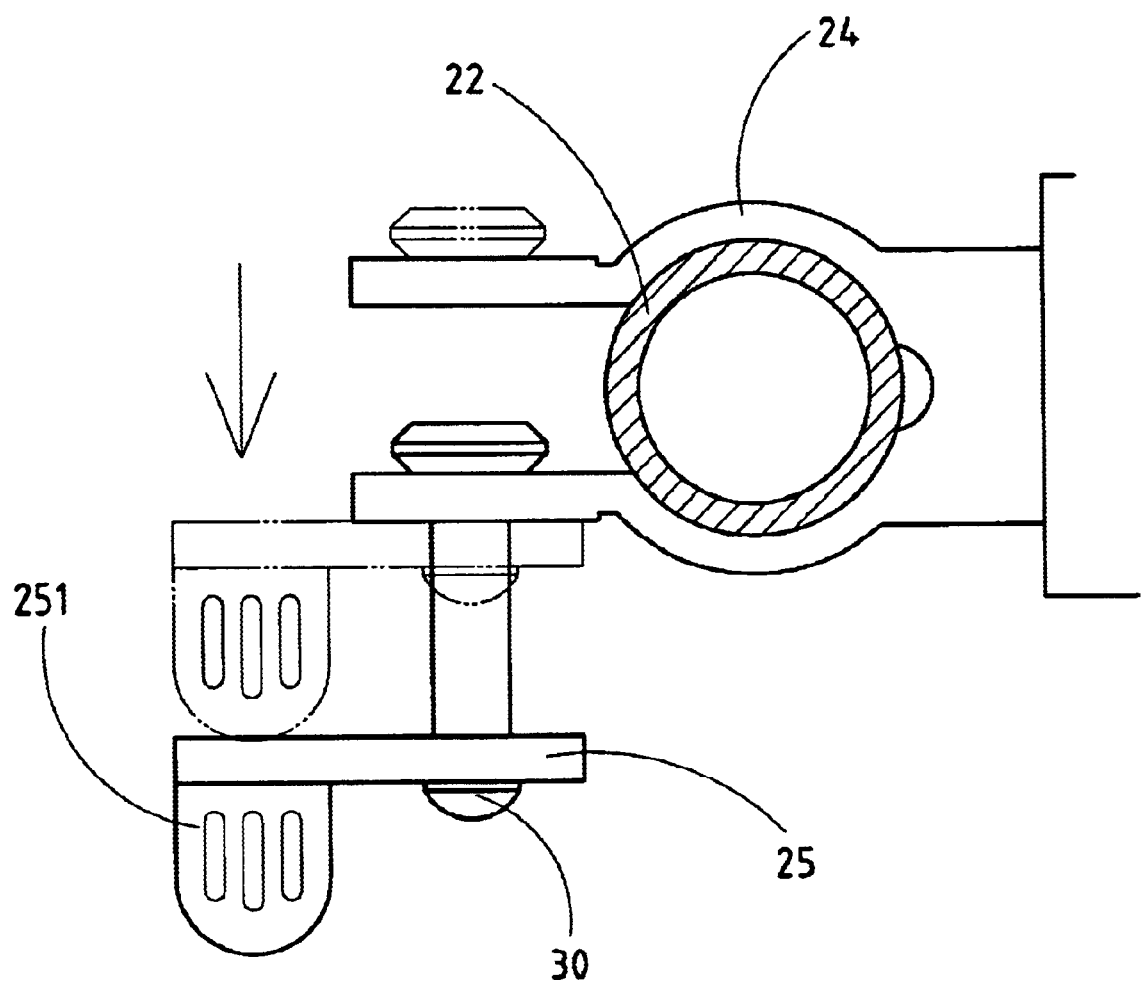
FIG. 6 shows a sectional schematic view of the change in action of the tree pruner of the present invention.
Figure 7:
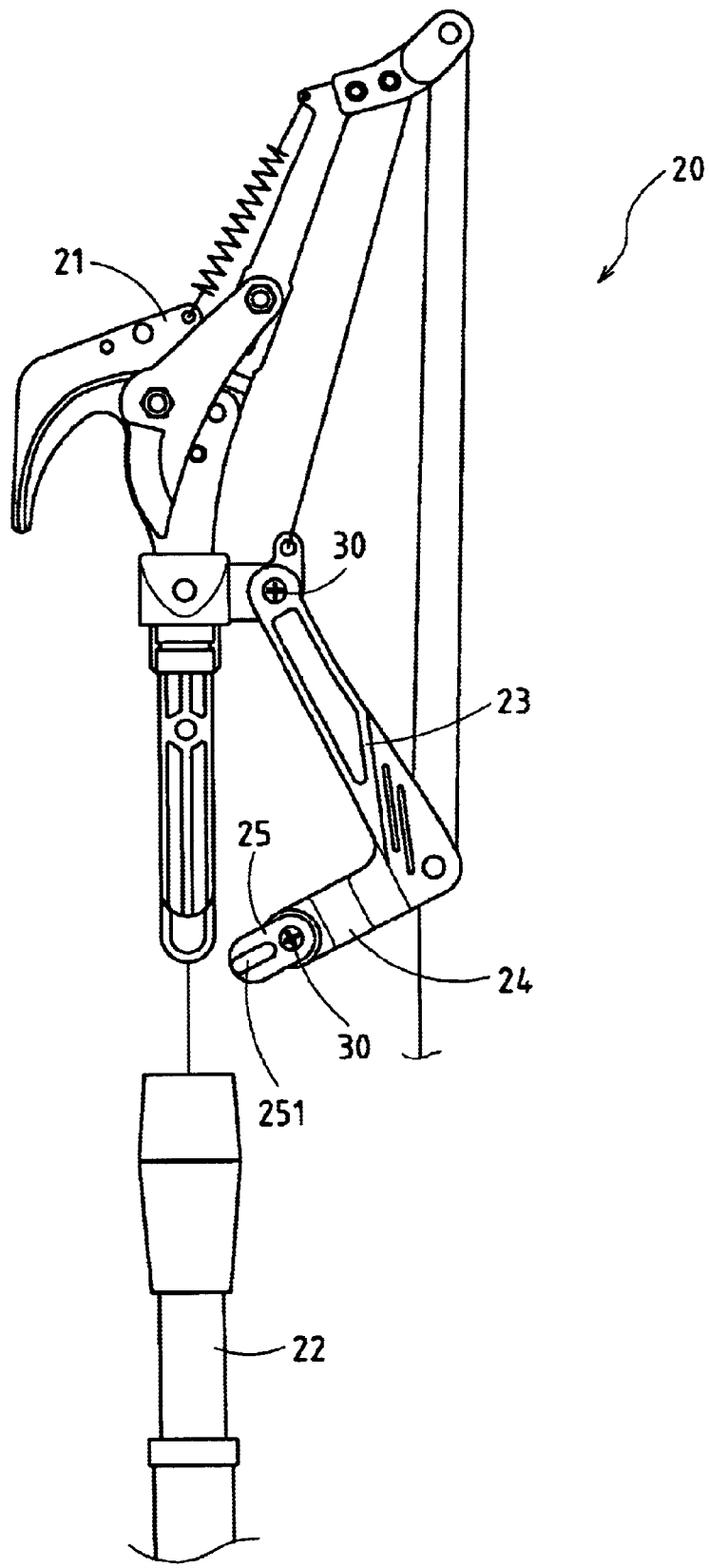
FIG. 7 shows another schematic view of the tree pruner of the present invention in action.

In the event that the handle portion 22 is damaged or replaced with a shorter or longer handle portion, the handle portion 22 can be unfastened with the brace portion 40, as illustrated in FIGS. 5, 6, and 7.

I claim:

1. A tree pruner comprising:

a blade portion;

a handle portion; and a brace portion for fastening detachably said blade portion and said handle portion; wherein said brace portion comprises:

a connection member pivoted at one end with said blade portion by a pivot;

a bracing member pivoted at one end with another end of said connection member and provided at another end with a through hole and a retaining slot;

a control member fastened pivotally to the other end of said bracing member by a pivot; and a retaining member received in said through hole of said bracing member such that one end of said retaining member is engaged with said pivot of said control member, and that said retaining member can be actuated by said control member to turn, said retaining member provided at another end with a flange whereby said flange is retained in said retaining slot of said bracing member so as to hold said retaining member in place in the wake of an act by which said handle portion is braced by said bracing member in conjunction with said control member and said retaining member.

* * * * *